March 31, 1959 C. M. CERVIN 2,879,539
POULTRY STUNNING DEVICE
Filed Dec. 18, 1956 2 Sheets-Sheet 1
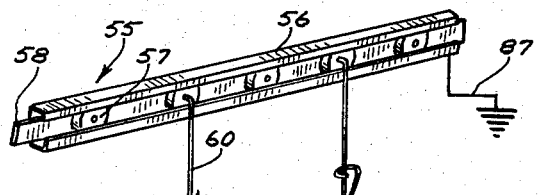
FIG. 1
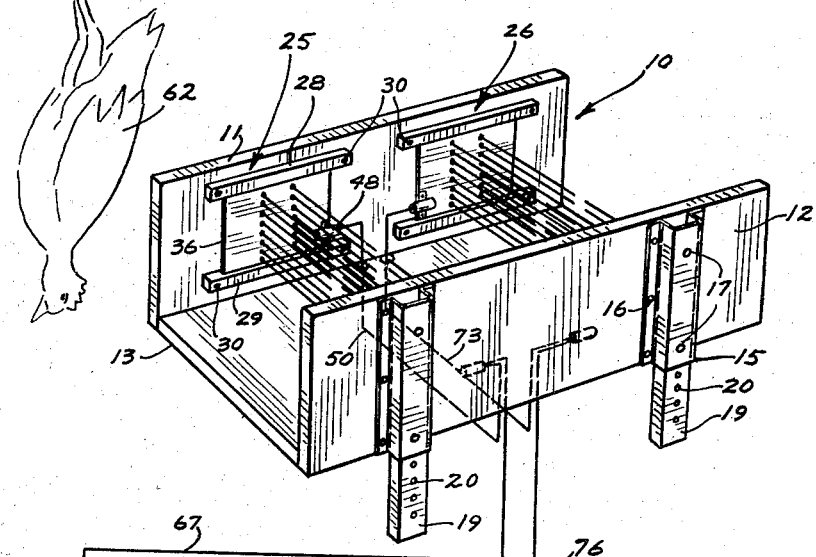
FIG. 3
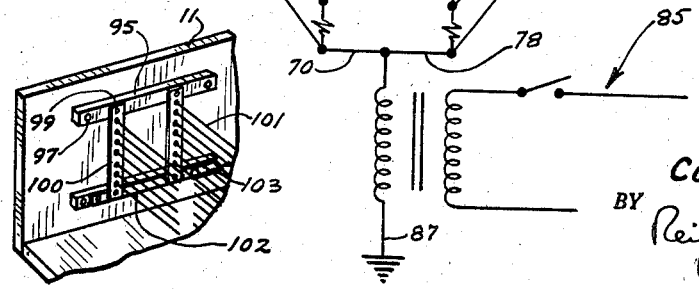
INVENTOR.
CURT M. CERVIN
BY
ATTORNEYS March 31, 1959  C. M. CERVIN  2,879,539
POULTRY STUNNING DEVICE
Filed Dec. 18, 1956  2 Sheets-Sheet 2
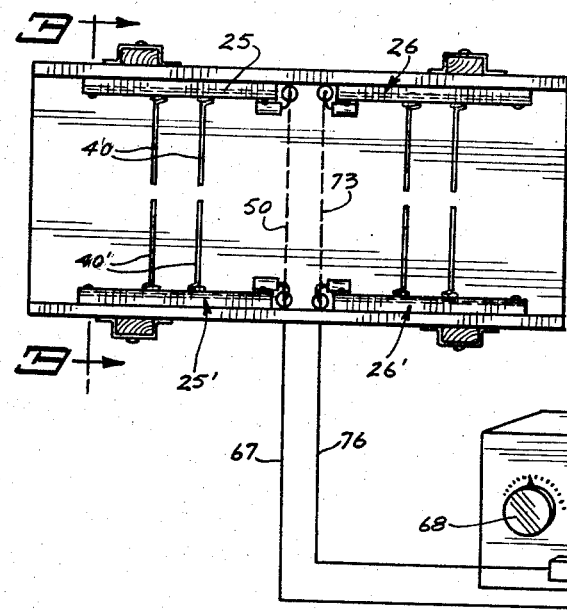
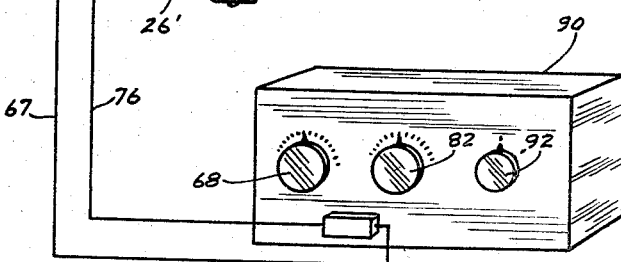
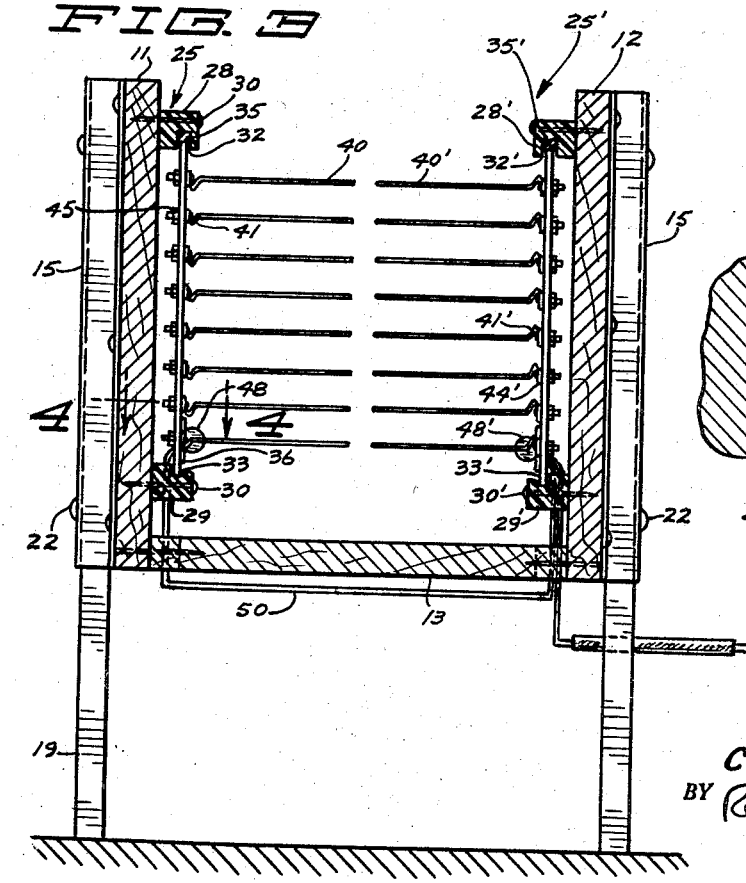
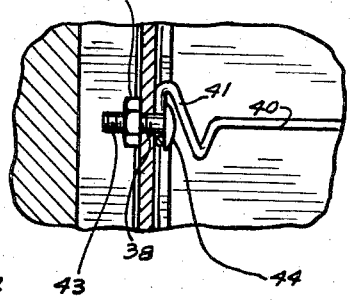
INVENTOR.
CURT M. CERVIN
BY
ATTORNEYS

United States Patent Office 2,879,539
Patented Mar. 31, 1959

2,879,539

POULTRY STUNNING DEVICE

Curt M. Cervin, Minneapolis, Minn.

Application December 18, 1956, Serial No. 629,021

9 Claims. (Cl. 17—11)

This invention relates to an electrical stunning device for poultry, and particularly for fowl such as chickens and turkeys. The purpose of this device is to render the fowl unconscious by an electrical shock. The shock when properly applied will merely stun the fowl rendering it quiet so that there is no violet jerking about resulting in bruises to the body, broken wings and broken feathers. Stunning relaxes the fowl so that the feathers do not become set and are more easily plucked out. Further the act of stunning stimulates the heart action which aids greatly in the bleeding when the fowl is finally stuck.

However various types of fowl require a different degree of shock to just stun them. Too great an electrical shock will electrocute and spoil the fowl rendering the fowl unfit for general marketing purposes. A broiler will require only from 5 to 35 milliamperes for proper stunning. A hen may require from 50 to 100 milliamperes, and a tom turkey may require up to 200 milliamperes. It is desirable therefore to have a stunning device having in connection therewith a circuit including a plurality of resistors which may be variously combined so that a certain known amount of resistance may be afforded to the passage of current used for stunning the fowl and whereby said resistance may be easily varied as required.

The circuit in connection with said stunning device is completed by including the fowl to be stunned. The feathers and the scaly surface of the legs of the fowl form insulating layers of material. A high initial voltage impact is required to break through said insulating layers quickly. The voltage should be sufficiently high so that the resistance in said insulating layers is a minor factor in the circuit in relation to the voltage so that the current will quickly arc through the feathers and break through the leg scales by carbonizing said scales. The fowl itself is not so still prior to stunning that electrical contact with a specific portion of the fowl, such as with the head, can be relied on. A sufficiently high voltage will quickly stun the bird on contact of any part of the bird with an electrode. It has been found in practice that approximately 2500 volts are required for effective stunning. With the first impact of a high voltage current though the fowl at that instant is not completely stunned, it has been found that the fowl's head as a reaction to such high voltage will extend downwardly and outwardly for a good contact with the electrodes in the stunning device and complete stunning is effected quickly. Stunning is most effectively accomplished through the head and neck of the fowl.

It is an object therefore of this invention to provide a device for stunning fowl, and more specifically for stunning various types of fowl requiring certain different charges of electrical current.

It is another object of this invention to provide a device embodying the use of a high voltage whereby the resistance of the fowl to the initial passage of current therethrough forms only a minor factor in the circuit.

It is a further object of this invention to provide a device for stunning fowl comprising a circuit including a plurality of electrode members, and means in series with said electrode members for varying in certain known amounts the resistance to the current passing through said circuit.

It is another object of this invention to provide a device for stunning fowl including a circuit comprising a plurality of electrode members, a conductor connected to said electrode members, a plurality of resistors, and means associated with said conductor for variably combining certain of said resistors to afford a known amount of resistance to the passage of current to said electrode members.

It is a more specific object of this invention to provide a device comprising an open ended frame having spaced side walls, a circuit comprising a pair of opposed groups of horizontally aligned vertically spaced electrode members in series respectively carried on facing surfaces of said side walls, said electrode members having closely spaced adjacent free ends, a plurality of resistors, means for combining said resistors to afford certain known amounts of resistance to the passage of current to said electrodes, and means for conveying fowl through said frame and into contact with said electrodes.

It is a still more specific object of this invention to provide a device for stunning fowl having in combination, an open ended frame having spaced side walls, a unit in said frame comprising a circuit including a pair of opposed groups of horizontally aligned vertically spaced electrode members respectively carried on facing surfaces of said side walls, said electrode members having closely spaced adjacent free ends, a plurality of resistors, means for combining certain of said resistors to afford certain known amounts of resistance to the passage of current to said electrodes, a second unit adjacent said first unit in said frame mounted in parallel to said first unit, a transformer delivering a high secondary voltage to said conductors in said first and second units, and means for conveying fowl through said frame into contact with said electrodes.

These and other objects and advantages of the invention will be fully set forth in the following description made in connection with the accompanying drawings in which like reference characters refer to similar parts throughout the several views and in which:

Fig. 1 is a perspective operational view of applicant's device with the diagram of an electrical circuit shown in connection therewith and with portions of the circuit and leg portions of the device thereof being shown in dotted line;

Fig. 2 is a top plan view of applicant's device with a portion thereof shown in perspective;

Fig. 3 is a view in vertical section on an enlarged scale taken on line 3—3 of Fig. 2, as indicated by the arrows;

Fig. 4 is an enlarged partial view of a portion of applicant's device taken on line 4—4 of Fig. 3, as indicated by the arrows; and Fig. 5 is a fragmentary view in perspective showing a modification of a portion of applicant's device.

Referring to the drawings, applicant's invention comprises an open ended frame 10. Said frame is preferably made of non-conductive material such as wood. Said frame has side walls 11 and 12 of some height joined by a bottom 13. A practical sized frame has been found to be approximately six feet in length and about three feet in width with said side walls approximately three feet in height. Said bottom may be variously formed but is here shown to be of a solid construction.

Secured in spaced pairs to the outer sides of said walls are vertical channel members 15 secured by screws 16 and each having vertically spaced apertures 17 in their front sides. Adapted to slidingly fit in said channel members are elongated supports or leg members 19 substantially rectangular in cross section. Said leg members respectively have a plurality of apertures 20 therethrough adapted to be aligned in register with said apertures 17. Said leg members 19 are held in position in said channel members 15 by pins 22. Thus said channel members and said leg members cooperate to form telescopic supports for said frame 10.

Mounted in said frame 10 on the inner surfaces of said side walls are electrical stunning elements 25, 25', 26 and 26'. Said elements 25 and 25' and said elements 26 and 26' are respectively mounted on facing surfaces of said walls in opposed relation and each of said pairs of elements form a stunning unit in applicant's device.

Said stunning elements may be variously formed, but as here illustrated, said element 25 comprises a pair of horizontal vertically spaced bars 28 and 29 secured to the inner side of said wall 11 by screws 30. Said bars are shown as being centered in substantially one-half of said wall surface. Said bars are substantially rectangular in plan and of some length and are formed of a dielectric material so as to form insulating members. Said bars have longitudinally extending slots 32 and 33 therein in facing sides and extending therealong. The forward edge of said slot 33 is somewhat shortened. Secured in said slot 32 is a resilient strip 35 of substantial thickness. Said slots 32 and 33 are positioned in said bars 28 and 29 to be spaced away from said wall 11.

Removably positioned between said bars 28 and 29 and having its upper and lower edges respectively resting in said slots 32 and 33 is an electrical conductive plate member 36. Said plate member is here shown to be rectangular in plan and somewhat shorter in length than the length of said bars. Said plate 36 has therein a plurality of horizontally closed spaced pairs of vertically spaced apertures 38. Removably secured to said plate in said apertures are electrodes 40 each formed of somewhat flexible rod material of small diameter and having a somewhat spiraled portion 41 at one end thereof. Said electrodes are of a length to extend just short of the midway point of the width of said frame 10. Said spiraled end portions 41 of said electrodes are respectively disposed through the apertured shanks 43 of bolts 44. Said shanks are here shown as being apertured adjacent the head portions of said bolts. Said shanks are placed through said apertures 38 and nuts 45 are fastened thereon to hold said bolts and said electrodes in position. Said electrodes will be frictionally held between the heads of said bolts and said plate. Secured to a lower portion of said plate is an electrical connector or plug 48 adapted to have an electrical conductor removably secured therein. Said electrodes may be variously positioned but are here illustrated as comprising a pair of spaced rows.

Said element 25' is identical in structure as to all of its parts to said element 25 and is mounted on said wall 12 in opposed relation to said element 25. The various parts of said element 25' are identified by the same numerals used to indicate the parts of said element 25 with the addition of a prime. The electrodes of said elements 25 and 25' will have their free ends closely spaced apart. Connecting plugs 48 and 48' as shown in Fig. 3 is a conductor 50.

Elements 26 and 26' are spaced somewhat longitudinally from said elements 25 and 25' and are respectively mounted in opposed relation on the facing surfaces of said walls 11 and 12. Said elements 26 and 26' are identical in structure to said elements 25 and 25' as to all of their parts. Said elements 26 and 26' are therefore not described in detail.

Said opposing elements 25 and 25' and 26 and 26' are respectively mounted in series in circuits to be described. Each of the pairs of said opposing elements mounted in series forms a stunning unit and said units are mounted in parallel.

Mounted in spaced relation to said frame 10 is an overhead conveyor 55 of which a broken away portion is shown in Fig. 1. Said conveyor as here shown comprises an overhead track 56 in which move rollers 57 held in longitudinally spaced relation and moved along by an endless belt 58. Shackles or hangers 60 depend from said rollers 57 and are adapted to hold secure the legs of fowl 62. Said conveyor 55 will be positioned so that the head of the fowl moved thereby will be drawn through said frame 10 into contact with the electrodes therein.

Including said pairs of elements 25—25' and 26—26' respectively are circuits 65 and 66. Circuit 65 comprises a conductor 67 connected to said plug 48' and a plurality of resistors 69. Said resistors are housed in a power box 90 shown in Fig. 2. Said resistors are hooked up in series in a conductor 70 running from a transformer 85 to a plurality of contact points 71. A dial control knob 68 having an arm 68a integral therewith and having said conductor 67 conected therewith is turned to contact said contact points 71 to combine any desired number of said resistors 69 to afford a known amount of resistance to the passage of current through said conductor 67.

In practice it has been found desirable to provide resistors which may be combined to have from 5 to 800 milliamperes of current to pass through said conductor. The range within these limits provides sufficient variation in amperage to properly stun the various fowl that will usually be handled.

Said circuit 66 is identical to said circuit 65 comprising said elements 26 and 26', the conductor 73 connecting said elements, a conductor 76 running to said element 26' and a plurality of resistors 77. Said resistors are hooked up in series to a conductor 78 running from said transformer 85 to said contact points 80. A dial control knob 82 having an arm 82a integral therewith and having said conductor 76 connected thereto is turned to combine various of said resistors as described in connection with said dial control knob 68. Contact points 71a and 80a are off current positions.

Said circuits 65 and 66 include said transformer 85 housed in said power box 90 and adapted to deliver a high secondary voltage. It has been found in practice that a voltage of 2500 volts is required for efficient performance of said stunning elements, particularly in providing an initial strong charge of electricity to quickly break through the resistance present in the fowl in its feathers and scaly outer leg surfaces. With the use of this high voltage, actual physical contact between the fowl and an electrode is not necessary. As on close proximity to an electrode, the current will arc over to the fowl and through its feathers. This high voltage will quickly carbonize the scaly outer surface found on the legs of the fowl and the circuit will thus be completed through the fowl and grounded. As here illustrated, said conveyor 55 is equipped with a ground wire 87. A control switch 92 is present in said power box for disconnecting said transformer from its source of electrical energy.

In operation, circuits 65 and 66 will be energized through said transformer 85. This will energize said elements 25—25' and 26—26'. The conveyor 55 will be put into operation and will carry fowl in spaced relation hanging from said hangers 60 and said fowl will be moved through said frame member 10 and in passage therethrough will contact said electrodes 40.

In practice the various type of fowl which are stunned require different degree of amperage. A broiler will require from 5 to 35 milliamperes, a hen will require from 50 to 100 milliamperes and a tom turkey will require up to 200 milliamperes. Hence the amperage in said circuits 65 and 66 will be adjusted to combine a definite desired number of the resistors in each of said circuits to deliver the desired amount of amperage in each of said circuits in accordance with the kind of fowl which are being stunned in any given operation. The flexibility of applicant's device in permitting a variable control to deliver certain different degrees of amperage gives a wide range of utility to applicant's device. On the approach of a fowl to the electrodes in elements 25—25', on close proximity to said electrodes the current with the use of 2500 volts will arc through the feathers and will pass through the fowl and will quickly carbonize the outer scaly surface of the leg of the fowl to complete the circuit through the conveyor which is grounded. Thus in the initial charge of current through the fowl there is the full effective impact of 2500 volts and the resistance provided by the fowl to the passage of current is a very minor factor in the circuit.

The fowl will then be moved through the opposed pairs of electrodes in said elements 25—25' and will be moved through the electrodes in said elements 26—26'. It is most desirable to have the head of the fowl first contact an electrode, but often the fowl will have the natural tendency of hiding its head under a wing. However with the use of high voltage in applicant's device the current will quickly pass through any portion of the body of the fowl and after the first impact of the current the head of the fowl will straighten out and will come into contact with said electrodes to complete the stunning operation. With the use of relatively low voltage there may not be sufficient impact of current to cause a fowl to straighten out its head to be effectively stunned all through the operation so that a percentage of the fowl will pass through the operation with only a minor or incomplete stunning effect. Hence the fowl will be struggling and jerking about during the operation which follows the stunning and in which operation the fowl is stuck in the throat to have a vein severed. Applicant's device overcomes this objectionable result.

In the use of a device where there is not present a variable amperage control, its utility is limited. If the device does not effectively stun the fowl, it has served no useful purpose. On the other hand if the amperage present is too great, instead of being just stunned, the fowl will be electrocuted and this destroys the value of the fowl for market purposes. It is very desirable to have an all purpose stunning device.

As previously described, said elements 25—25' and 26—26' are respectively mounted in series and said respective pairs of elements in relation to one another are set up in parallel. In practice both pairs of elements are usually energized so that fowl may be moved through applicant's device at a high rate of speed and there will be a sufficient number of successive charges of current passing through the fowl to effectively stun the fowl. Said electrodes 40 and 40' will be spaced closely horizontally so that fowl will pass quickly therethrough singly. The adjacent free ends of said electrodes will be spaced closely together so that no part of a fowl will be able to pass therebetween without contacting said electrodes. It is understood that elements 26—26' may or may not be energized with elements 25—25' and if desired they may be energized to a different degree of amperage to have the second shock to the fowl in a lesser degree than the first. Thus applicant's device has a wide range of utility.

With reference to Fig. 5 a modification of the structure of the elements in applicant's device is shown. Each of the elements previously described may be formed as comprising a pair of vertically spaced parallel bars 95 and 96 which are secured to the inner side of wall 11 by screws 97. Said bars are substantially rectangular in cross section and will be formed of an insulating material. Removably secured by bolts 99 to said insulating bars 95 and 96 are horizontally spaced vertical members 100 formed as flat elongated plate members of small width and thickness formed of electrically conductive material. Electrodes 101 identical in structure to said electrodes 40 are removably secured to said plate members 100 in vertically spaced relation in identically the same manner as said electrodes 40 are secured to said plate members 36. An electrically conductive member 102 formed as a bar extends between said spaced plate members 100 to join them in series and carried on said member 102 is an electrical plug 103. Thus said bars 100 are individually removable for the quick replacement of any or all of the electrodes thereon.

The operation of the modification of applicant's device is identical to the operation above described.

Thus it is seen that I have provided a very efficient and simply constructed stunning device providing for the use of high voltage and for a positive control of the amount of amperage used in the device wherein there may be combined a certain number of resistors to afford different known amounts of resistance to the passage of current through the circuits therein, or if desired the resistance may vary in each of the circuits. Applicant's device has a wide range of utility and the amperage therein may be adjusted for the effective and proper stunning of any type of fowl. Applicant's device is being produced on a commercial basis and has been found to be very successful in operation.

It will of course be understood that various changes may be made in the form, details, arrangement and proportions of the parts, without departing from the scope of applicant's invention, which, generally stated, consists in a device capable of carrying out the objects above set forth in the parts and combinations of parts disclosed and defined in the appended claims.

What is claimed is:

1. A device for stunning poultry having in combination, an open ended frame comprising spaced side walls, a unit mounted in said frame comprising a pair of horizontally extending vertically spaced insulating bars secured to each of the facing sides of said side walls, each pair of said bars having longitudinally extending facing slots therein, an electrically conductive plate member removably disposed between each pair of said bars, said plate members having their upper and lower edge portions disposed in said slots, each of said plate members respectively having secured thereto a group of vertically spaced horizontally extending flexible rods forming electrodes, said groups of electrodes being in opposed relation and having closely spaced adjacent free ends and a circuit including said plates, a conductor and a conveyor for conveying said poultry through said frame and into contact with said electrodes.

2. The structure set forth in claim 1, a resilient strip of some thickness respectively secured in one of each pair of said facing slots for resiliently removably holding said plates mounted in position between said pairs of bars.

3. The structure set forth in claim 1, each of said plates having parallel groups of said electrodes and said plates being connected in series.

4. The structure set forth in claim 1, a second unit mounted in said frame identical to said first unit, said second unit being connected in series and said first and second units being connected in parallel.

5. The structure set forth in claim 1, and longitudinally spaced pairs of vertically disposed channel members respectively secured to the outer sides of said side walls, said channel members respectively having a pair of vertically spaced apertures therein, leg members adapted to respectively fit in said channels having a plurality of vertically spaced apertures therein adapted to be placed in register with said apertures in said channels and pegs for holding said leg members in certain desired vertical positions in said channel members for supporting said frame.

6. The structure set forth in claim 1, said electrodes having somewhat spiraled inner end portions, a plurality of bolts, said bolts having apertured shanks adjacent substantially broad head portions, said ends of said electrodes respectively being disposed through said apertures in said bolts, and said bolts being removably secured to said plate members.

7. A device for stunning poultry having in combination, an open ended frame having spaced side walls of some height, spaced pairs of telescopic supporting members secured to the outer sides of said side walls, a unit mounted in one portion of said frame comprising a pair of horizontal vertically spaced dielectric bars secured in opposed alignment to each of the facing surfaces of said side walls, the facing sides of each of said pairs of bars having longitudinally extending slots therein, resilient strips of some thickness secured in the upper of said slots, an electrically conductive plate member removably carried between each pair of said bars having its upper and lower edge portions disposed in said slots, a plurality of electrode members formed as elongated flexible rods of small diameter, said electrode members being positioned horizontally in spaced pairs in opposed relation respectively on said plates and being spaced vertically and respectively having their remote ends removably secured to said plates and having their free ends closely spaced apart, a conductor connected to said plates in series, a plurality of resistors in association with said conductor, and means for combining certain of said resistors to afford certain known amounts of resistance to the passage of current from said conductor to said electrodes, a circuit including said plates, electrodes, conductor and resistors, and a second unit identical with said first unit mounted in an adjacent portion of said frame, a second circuit identical with said first circuit in association with said second unit, and said first and second units being in parallel.

8. A device for stunning poultry having in combination, an open-ended frame comprising spaced side walls, a pair of electrically conductive members in opposed relation on each of said side walls, means carried by said side walls for removably securing said members thereto, each of said members having secured thereto a group of vertically spaced horizontally extending electrode members, said groups of electrode members in opposed relation having closely spaced adjacent free ends and a circuit including said first mentioned member, an electrical conductor and a conveyor for conveying said poultry through said frame into contact with said electrodes.

9. A device for stunning poultry having in combination, an open-ended frame comprising spaced side walls, a pair of vertically disposed horizontally spaced electrically conductive bars on each of said walls in opposed relation, means on said side walls for insulating said bars therefrom, means carried by said side walls for removably securing said bars thereto, each of said bars having secured thereto a group of vertically spaced horizontally extending electrode members, said group of electrode members in opposed relation having closely spaced adjacent free ends and a circuit including said vertically disposed bars and said electrodes secured thereto, an electrical conductor and a conveyor for conveying said poultry through said frame into contact with said electrodes.

References Cited in the file of this patent

UNITED STATES PATENTS

| | | |
|---|---|---|
| 2,335,993 | Bland et al. | Dec. 7, 1943 |
| 2,512,089 | Cervin | June 20, 1950 |
| 2,536,220 | Rabin | Jan. 2, 1951 |
| 2,621,362 | Cosden | Dec. 16, 1952 |